United States Patent [19]
Gaule et al.

[11] 3,973,224
[45] Aug. 3, 1976

[54] TANDEM CONFIGURATION FOR EMP PROTECTION

[75] Inventors: Gerhart K. Gaule, Elberon; Paul Laplante, Eatontown, both of N.J.

[73] Assignee: The United States of America as represented by the Secretary of the Army, Washington, D.C.

[22] Filed: Oct. 28, 1975

[21] Appl. No.: 625,979

[52] U.S. Cl. .................. 333/12; 325/362; 333/17 L
[51] Int. Cl.² ........................ H01P 1/22; H04B 1/10
[58] Field of Search ........... 325/150, 362; 343/851; 333/12, 13, 17 L; 328/165

[56] References Cited
UNITED STATES PATENTS

| | | |
|---|---|---|
| 3,174,119 | 3/1965 | Jones et al. .................. 333/17 L |
| 3,521,197 | 7/1970 | Broderick .................... 333/13 |
| 3,719,904 | 3/1973 | Bragg ........................ 333/12 |
| 3,931,577 | 1/1976 | Barnett ...................... 325/362 |

*Primary Examiner*—Paul L. Gensler
*Attorney, Agent, or Firm*—Nathan Edelberg; Sheldon Kanars; Michael Zelenka

[57] ABSTRACT

An electromagnetic pulse supressor capable of attenuating both high and low frequency electromagnetic pulses in coaxial transmission lines. The invention utilizes a gas ionization device in combination with a metal oxide device and a biased diode and is so constructed as to allow for differing response times in each, thereby preventing damage to the overall suppressor.

4 Claims, 2 Drawing Figures

TANDEM CONFIGURATION FOR EMP PROTECTION

BACKGROUND OF THE INVENTION

Until recently two approaches have been used to suppress transients in electronic circuits. The first is a Zener diode type of device, that is, an electronic device which is strongly non-linear but which is without discontinuity in the current/voltage characteristic. These devices are positioned so as to hold off current flow during the circuit's usual operating conditions but allow current flow during conditions of excessive voltage application due to their "avalanche" current/voltage characteristic.

A second type of device used for this application in the past has been the gas ionization or "spark gap" device. These devices are characterized by a continuous current-voltage curve with a negative resistance region. In a basic configuration they are comprised of two electrodes separated by some small distance in a sealed container filled with inert gas. Under normal operating conditions the voltage across the device is insufficient to ionize the gas and therefore there is no current flow. Ionization of the gas is a function of the magnitude and duration of the applied voltage. At some low voltage limit the gas will not ionize regardless of the duration of application. As the voltage is increased the duration of the pulse necessary to ionize the gas is decreased.

A far more recently developed device which may be used for transient supression is the metal oxide switching component developed at Yeshiva University by Paul M. Raccah, Teodoro Halpern and Soo Hee Shim (U.S. patent application Ser. No. 529,222). This device consists of a layer of polycrystalline refractory transition metal oxide, such as $NbO_2$, grown on a conducting refractory substrate. This device has the characteristic of providing a high resistance device when subjected to a high voltage pulse. The device is capable of handling currents in the order of 80 amperes while maintaining a response time shorter than 0.7 nanoseconds.

All three of the above described devices when used alone have undesirable limitations as protective devices. The response time of the gas ionization device is in the order of 3 to 4 nanoseconds, for pulses in the order of 2000 volts and increases rapidly as voltage is reduced, being in the order of milliseconds for pulses of 100 volt amplitude.

The Zener diode has excellent response time but is unable to combine high power capabilities with low insertion loss.

The metal oxide switching component provides excellent power handling capability with good response time but fails to reduce the voltage sufficiently for many applications, thereby imperilling the ciruitry it was intended to protect.

When these existing devices are combined in the special manner described herein an electromagnetic pulse suppressor is obtainable which has rapid response time, excellent power handling capabilities and which will protect all but the most sensitive circuitry.

SUMMARY OF THE INVENTION

The present invention relates to the tandem use of a gas ionization device, a metal oxide switching component, and a biased diode which serves as a voltage limiter. The tandem configuration provides a simple and inexpensive method of eliminating the harmful effects of an undesirable high voltage electromagnetic pulse in a high frequency transmission link, or in the antenna of a receiver or transmitter. Such a pulse may result from lightning or distant nuclear blasts. The configuration is such that the received pulse first encounters the gas ionization device and subsequently reaches the metal oxide switching component and biased diode. In its high resistance state the capacitance of the tandem configuration is low so that high frequency signals are not greatly attenuated. When subjected to a fast-rising high voltage pulse, however, the metal oxide switching component clamps the pulse at a nominal 100 volts. This residual, relatively high energy, pulse would still destroy many sensitive receiver components were it not for the biased diode which reduces the remaining pulse to the level of the bias. In the situation where a pulse of sufficient duration and magnitude is encountered the gas ionization device will energize thereby reducing the load on the metal oxide device and protecting it from burnout. The invention thus provides an effective means to eliminate the harmful effects of an undesirable electromagnetic pulse in high frequency transmission lines without the necessity of replacing protective components after each submission to said undesirable pulse.

DETAILED DESCRIPTION OF THE INVENTION

Figure 1:
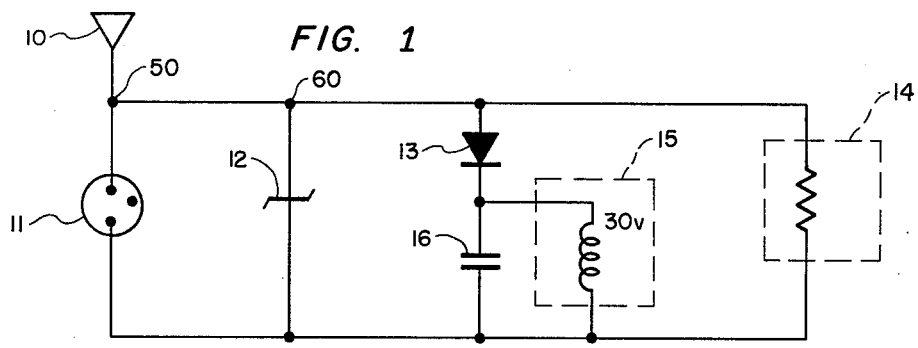
FIG. 1 is a schematic representation of a preferred embodiment of the invention.
Figure 2:
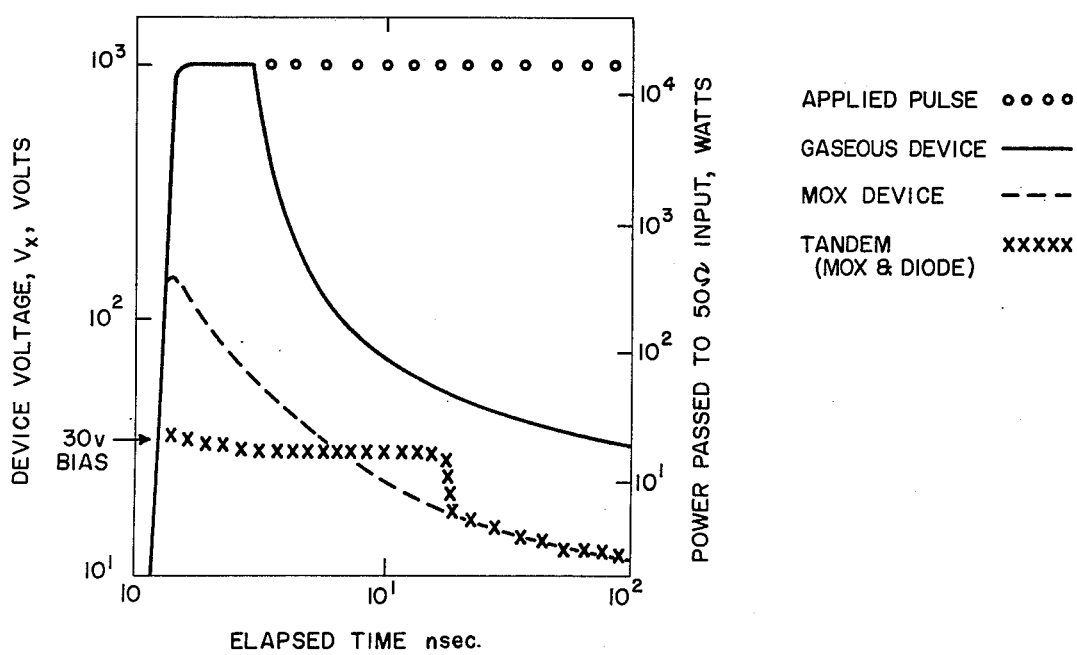
FIG. 2 is a graphic representation of pulse attenuation when utilizing different protective devices.

FIG. 1 is a schematic representation of one embodiment of the invention. In normal operation the antenna 10 receives radio frequency signals whose magnitude is generally in the order of microvolts. These signals travel down the coaxial transmission line past the gas ionization device 11, the MOX device 12, and the reversed biased diode 13 to the receiver 14. The capacitance of the gas ionization device 11 and the metal oxide device 12 in their high resistance state is inherently low. The diode 13 is selected to provide for low capacitance, a 1N914 for example. The diode 13 is reversed biased by a power supply 15 which further reduces the effective capacitance and determines the level at which the diode conducts, 30 volts in the embodiment shown. In order to further reduce the effect of this biased diode 13 on desirable signals a capacitor 16 is installed in series with diode 13. This capacitor 16 is chosen to be as large as possible while minimizing its stray inductance. A unit with a capacitance value in excess of 100,000 pf. is utilized in the preferred embodiment. Since this large capacitance is in series with the low capacitance, reverse biased diode 13 so long as the pulse at point 40 is below the bias level, the effective capacitance of the diode and capacitor combination is very low.

Operation of the supressor may best be illustrated by hypothesizing the introduction of a 1000 volt pulse of 1 microsecond duration at the antenna 10. At this voltage the gas ionization device 11 will not energize for the first 10 nanoseconds. That part (the first 10 nanoseconds) of the incoming pulse therefore moves down the line toward the metal oxide device 12. At this voltage the metal oxide device 12 begins to conduct in 0.7 nanoseconds. Once the metal oxide device 12 begins to conduct, the voltage at point 50 goes to 100 volts, thereby preventing the gas ionization device from energizing. Accordingly, the metal oxide device 12 must be positioned sufficiently electrically distant from the gas ionization device to enable the gas ionization device to energize before the metal oxide device 12 begins to conduct. Neglecting the turn on time of the metal oxide device 12 and assuming the pulse travels at 0.6 the speed of light in free space, $3 \times 10^8$ meters per second, the electrical separation must be at least 1.8 meters for the example given, that is, assuming an ionization time of 10 nanoseconds for the gas ionization device.

A similar situation exists in the relationship between the metal oxide device 12 and the biased diode 13. As noted earlier use of the biased diode 13 is necessitated by the fact that the circuitry to be protected 14 cannot withstand either the 100 volt residual pulse remaining after the incoming pulse has encountered the metal oxide device 12, or the first 0.7 nanoseconds of the incoming pulse which passes the metal oxide 12 device. The biased diode 13 will clip both of these levels to the bias voltage. If the electrical separation between the biased diode 13 and the metal oxide device 12 is insufficient, the diode 13 will begin to conduct before the metal oxide device 12. This will reduce the voltage at point 60 to the power supply voltage thus preventing the metal oxide device 12 from turning on and causing the diode 13 to absorb the full voltage load and burn out. The diode 13 and the metal oxide device 12 therefore must be electrically separated by a distance sufficient to insure that the metal oxide device 12 turns on before the diode 13 begins to conduct. Assuming the metal oxide device 12 takes 0.7 nanoseconds to begin to conduct and the pulse propagates at 0.6 the speed of light, the metal oxide device 12 and diode 13 must be separated by a distance of 0.126 meters to insure the former begins to conduct before the latter. When the components of the suppressor are assembled as described above the unit will function repeatedly without damage. It should be noted the ideal electrical spacing required between the gas discharge device 11 and metal oxide device 12 will vary as a function of the magnitude of the undesirable pulse. Because the metal oxide device 12 is passive when conducting it has the capability of withstanding considerable power without damage and the gas ionization device 11 may be fixedly positioned sufficiently electrically distant to prevent any possibility of damage to the metal oxide device 12 and yet insure the energization of the gas ionization device 11 when subjected to long duration pulse of relatively low peak power.

What is claimed:
1. A pulse suppression circuit comprising:
    a transmission line having an input and an output end and having three elements connected thereto, the first element being a gas ionization device, the second element being a metal oxide device and the third element being a clamping means, said elements connected across said transmission line and arranged in a tandem configuration in the order named with the gas ionization device closest to the input end of said coaxial line, said elements being spaced sufficiently electrically distant from each other so that the propagation time between elements of an undesired pulse introduced at the input end of the line is greater than the activation time of the preceding element.
2. The pulse suppression circuit of claim 1 wherein the transmission line is a coaxial line.
3. The pulse suppression circuit of claim 2 wherein the clamping means comprises a reverse biased diode in series with a large capacitor having low stray inductance.
4. The pulse suppression circuit of claim 3 wherein the input end of the coaxial line is connected to an antenna and the output end of the coaxial line is connected to a utilization device.

* * * * *